US011339628B2

(12) United States Patent
Reid

(10) Patent No.: US 11,339,628 B2
(45) Date of Patent: May 24, 2022

(54) HYDRAULIC LINE BALANCE MANIFOLD

(71) Applicant: Halliburton Energy Services, Inc., Houston, TX (US)

(72) Inventor: Michael Adam Reid, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/629,721

(22) PCT Filed: Sep. 13, 2018

(86) PCT No.: PCT/US2018/050894
§ 371 (c)(1),
(2) Date: Jan. 9, 2020

(87) PCT Pub. No.: WO2020/055410
PCT Pub. Date: Mar. 19, 2020

(65) Prior Publication Data
US 2021/0246761 A1 Aug. 12, 2021

(51) Int. Cl.
*E21B 34/10* (2006.01)
*E21B 34/16* (2006.01)
*G05D 16/10* (2006.01)

(52) U.S. Cl.
CPC .............. *E21B 34/10* (2013.01); *E21B 34/16* (2013.01); *G05D 16/101* (2019.01)

(58) Field of Classification Search
CPC ......... E21B 34/10; E21B 34/16; G05D 16/10; G05D 16/101; G05D 16/103
See application file for complete search history.

(56) References Cited

U.S. PATENT DOCUMENTS

| 4,790,393 A | 12/1988 | Larronde et al. |
| 5,564,501 A * | 10/1996 | Strattan ............... E21B 33/0355 166/375 |
| 7,878,252 B2 | 2/2011 | Smith et al. |
| 2010/0126774 A1 | 5/2010 | Downton |
| 2012/0073829 A1 * | 3/2012 | Smith ..................... E21B 34/10 166/375 |
| 2017/0268314 A1 | 9/2017 | Jones et al. |

OTHER PUBLICATIONS

International Search Report and Written Opinion for PCT application PCT/US2018/050894 dated Jun. 12, 2019, 10 pages.

* cited by examiner

*Primary Examiner* — Matthew R Buck
(74) *Attorney, Agent, or Firm* — Scott Richardson; C. Tumey Law Group PLLC

(57) ABSTRACT

A hydraulic line balance manifold includes a housing having first and second open ports for fluidly coupling an upper open line to a downhole tool, first and second close ports for fluidly coupling an upper close line to the downhole tool, and bypass channel for fluidly coupling the second open port with the second close port according to pressure within the upper open line and the upper close line. A sensor piston having first and second positions relative to the housing is slidably disposed within the housing, the second open port fluidly uncoupled from the second close port through the bypass channel when the sensor piston is in the first position, second open port fluidly coupled to the second close port through the bypass channel when the piston is in the second position for reducing fluid resistance to mechanical operation of the slave valve in a mechanical override intervention operation.

20 Claims, 9 Drawing Sheets

HYDRAULIC LINE BALANCE MANIFOLD

BACKGROUND OF THE INVENTION

1. Field of the Invention

The present disclosure relates to hydraulically controlled downhole devices, and more particularly to hydraulic line balance manifolds and hydraulic control systems having hydraulic line balance manifolds to control fluid flow to hydraulically operated downhole devices.

2. Description of Related Art

Production wells, such as those used to produce oil and gas from subterranean formations, commonly employ hydraulic devices like valves to control fluid flow from the subterranean formation. Such hydraulic devices are generally operated by application of pressurized hydraulic fluid to the valve from the surface through control lines connecting the device to the surface. Hydraulic valves generally employ a valve member that retains its position when pressure in hydraulic control lines to the valve is balance and changes position in response change in pressure between the hydraulic control lines, the position change typically restoring pressure balance between the hydraulic control lines.

Hydraulically operated downhole devices can sometimes become unresponsive to hydraulic pressure imbalance used to operate the device. When this happens it can be necessary to manually intervene to operate the downhole device. For example, when a hydraulically operated valve becomes stuck an intervention device is typically run down to the valve from surface to engage and apply force to the valve member to move the stuck valve member. When sufficient force is applied to the valve member, i.e., force sufficient to overcome the resistance of the valve member to movement and the resistance posed by the hydraulic fluid in the hydraulic control lines, the valve member generally moves in response to the force and the intervention succeeds. When sufficient force cannot be applied to the valve member due to the resistance presented by the valve member and hydraulic fluid in the hydraulic control lines it can be necessary replace the valve, which can be time consuming and costly.

Such conventional methods and systems have generally been considered satisfactory for their intended purpose. However, there remains a need in the art for improved hydraulic line balance manifolds, hydraulic control systems for hydraulically operated downhole devices, and methods of operating hydraulically operated downhole devices. The present disclosure provides a solution for this need.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
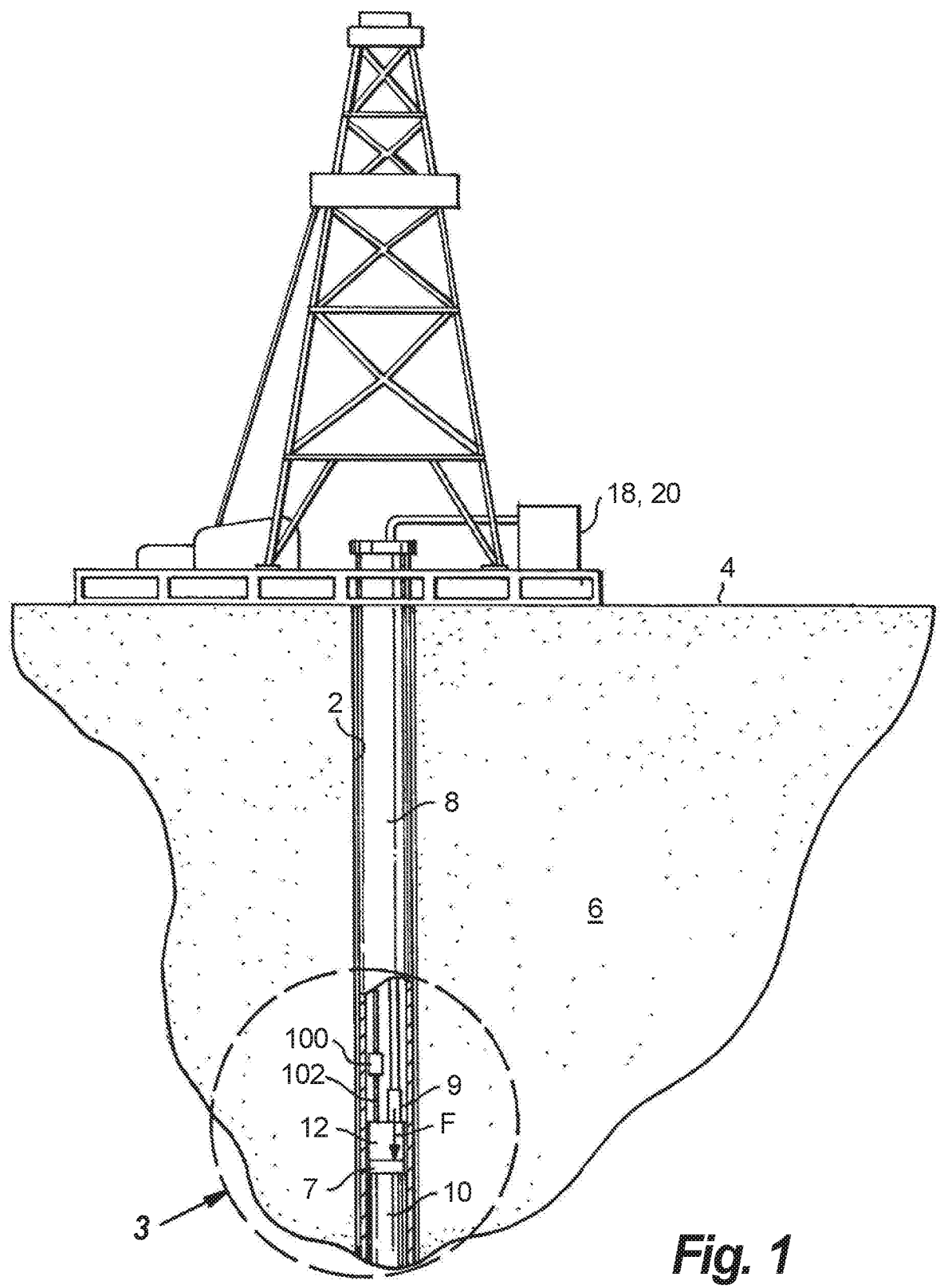
FIG. 1 is a schematic side elevation view of an exemplary embodiment of a downhole hydraulic control system having a hydraulic line balance manifold constructed in accordance with the present disclosure, showing the hydraulic line balance manifold decoupling a valve from a fluid source to reduce the amount of force necessary to manually operate the valve using a shifting tool run into the valve by a tube string.

Reference will now be made to the drawings wherein like reference numerals identify similar structural features or aspects of the subject disclosure. For purposes of explanation and illustration, and not limitation, a partial view of an exemplary embodiment of a hydraulic line balance manifold in accordance with the disclosure is shown in FIG. 1 and is designated generally by reference character 100. Other embodiments of hydraulic line balance manifolds, hydraulic control systems having hydraulic line balance manifolds, and methods of controlling hydraulic flow to hydraulically operated down device like valves in accordance with the disclosure, or aspects thereof, are provided in FIGS. 2-9, as will be described. The systems and methods described herein can be used to hydraulically (or fluidly) separate upper open and close control lines lower open and close control lines to provide control of hydraulic fluid flow to a slave valve at a downhole locations proximate the slave valve, such as within the wellbore in oil, gas, and/or water producing wells, though the present disclosure is not limited to hydraulically operated valves or to oil, gas and/or water producing wells in general.

As used herein the terms upper and lower refer to proximity of a hydraulic control line to a fluid source and hydraulically operated device. In this respect connected hydraulically operated device to a fluid source used to operate the device. In this respect a lower control is lines are proximate the device operated by the fluid. Upper lines are distal the device operated by the fluid, e.g., between the lower lines and the fluid source.

Figure 2:
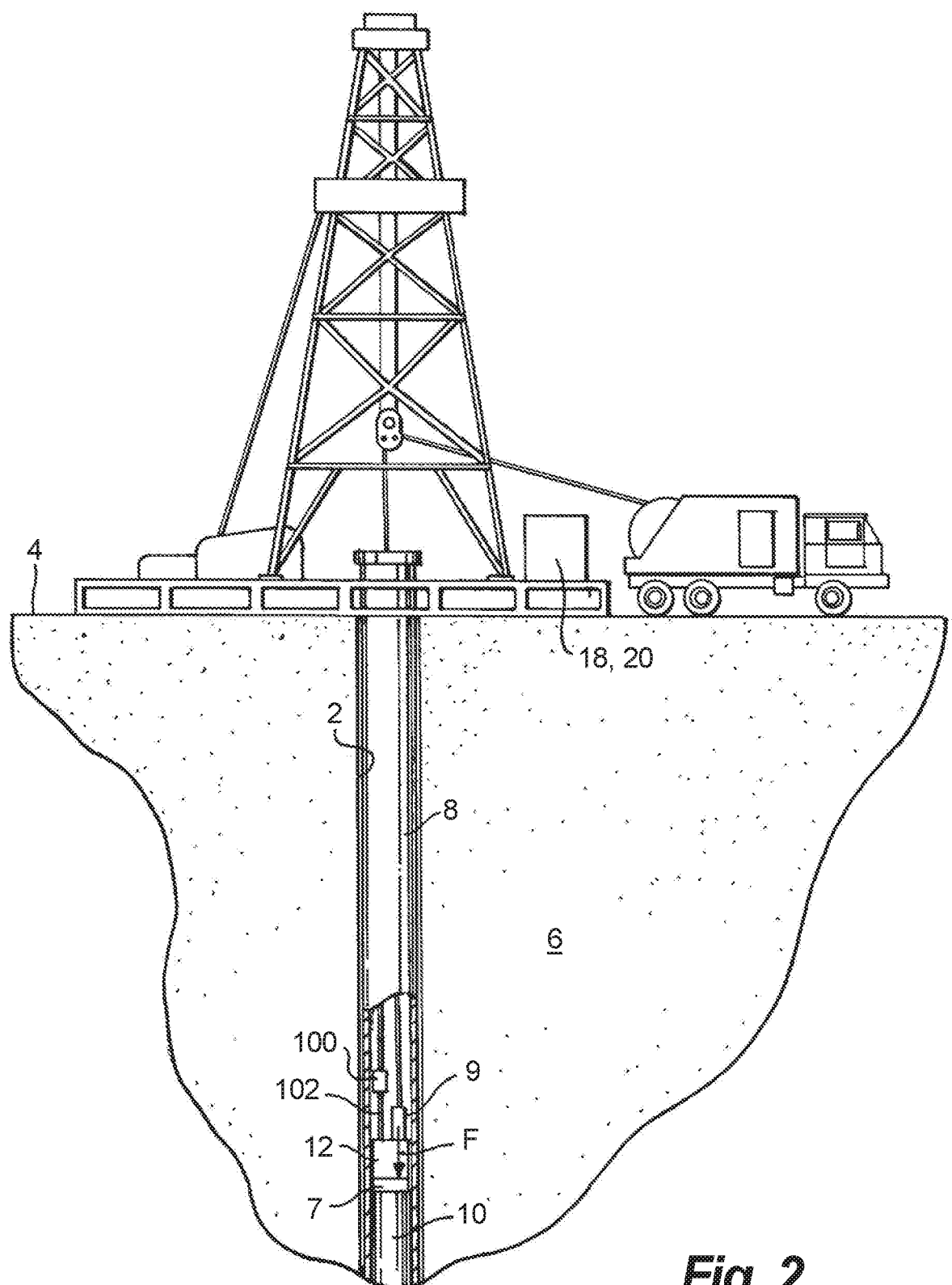
FIG. 2 is a schematic side elevation view of another exemplary embodiment of a hydraulic control system having the hydraulic line balance manifold of FIG. 1, showing the hydraulic line balance manifold decoupling a valve from a fluid source to reduce the amount of force necessary to manually operate the valve using a shifting tool run into the valve by a wireline.

Referring to FIGS. 1 and 2, a wellbore 2 extends from surface 4 to a geologic formation 6. A string 8 extends through wellbore 2 to formation 6 and includes production tubing 10, a slave valve 12, and a hydraulic control system 102. Hydraulic control system 102 includes hydraulic line balance manifold 100. These components are strung together in a formation for production, e.g., of oil, gas and/or water, from within formation 6, hydraulic control system 102 being in operative communication with slave valve 12 for controlling flow from wellbore 2 to surface 4. An intervention tool 9 is shown engaging slave valve 12 during an intervention event wherein intervention tool 9 exerts mechanical force F to a valve member 7 of slave valve 12, slave valve 12 by virtue of hydraulic line balance manifold 100 being hydraulically separated from a hydraulic fluid source 18/20 located at surface 4. FIG. 2 shows a wireline system engaging slave valve 12 with intervention tool 9 during an override intervention event.

Figure 3:
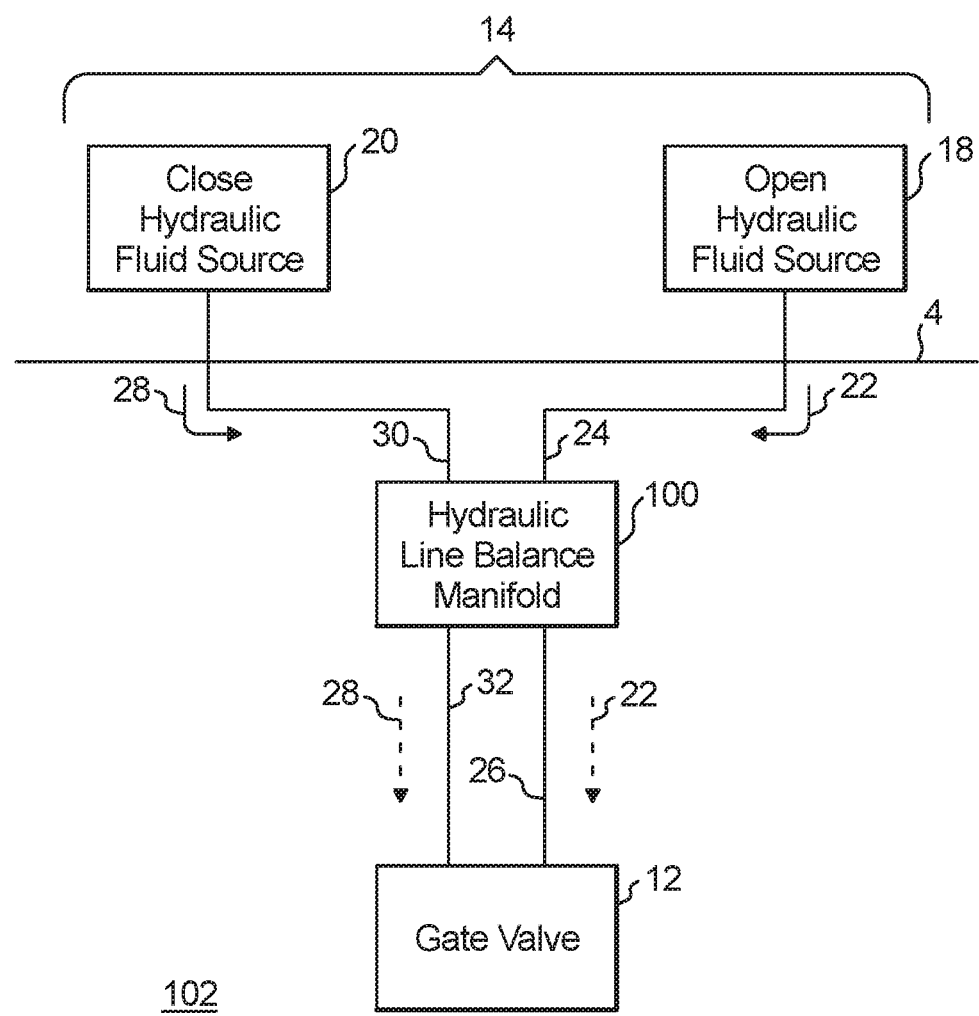
FIG. 3 is a schematic diagram of a hydraulic control system including the hydraulic line balance manifold of FIG. 1, showing the hydraulic line balance manifold positioned at a downhole location proximate a valve to disconnect the valve at the downhole location from a fluid source and fluid return located at the surface.
Figure 4:
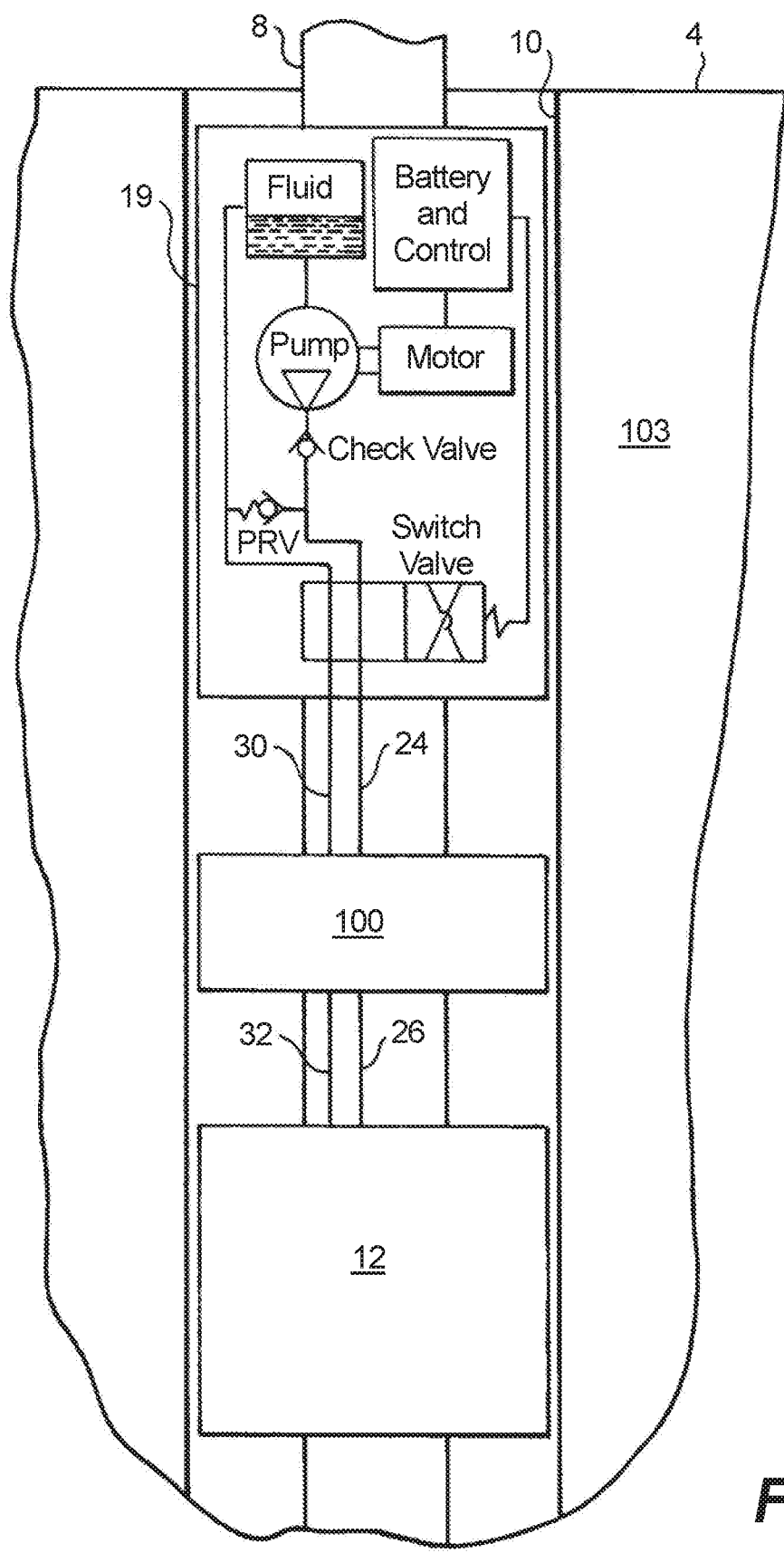
FIG. 4 is a schematic diagram of a hydraulic control system including the hydraulic line balance manifold of FIG. 1, showing the hydraulic line balance manifold positioned at a downhole location proximate a valve to disconnect the valve at the downhole location from a fluid source and fluid return located downhole with the valve.

With reference to FIGS. 3 and 4, hydraulic control system 102 is shown. Hydraulic control system 102 includes hydraulic line balance manifold 100, an open hydraulic fluid source 18, a close hydraulic fluid source 20, and slave valve 12. Slave valve 12 is disposed below surface 4 (shown in FIG. 1) and within wellbore 2 (shown in FIG. 1). In embodiments described herein slave valve 12 is hydraulically controlled. In accordance with certain embodiments slave valve 12 can be a completion product, slave valve 12 including one or more of a sliding sleeve, a choke, and a ball valve controlled through relatively long hydraulic lines.

Open hydraulic fluid source 18 is configured to selectively apply open pressurized hydraulic fluid 22 to slave valve 12 for opening slave valve 12. In certain embodiments application of open pressurized hydraulic fluid 22 maintains slave valve 12 in an open state. In this respect open hydraulic fluid source 18 is disposed on surface 4 and is connected to hydraulic line balance manifold 100 by an upper open line 24. Hydraulic line balance manifold 100 in turn connects upper open line 24 to slave valve 12 through a lower open line 26. Lower open line 26 and upper open line 24 are both configured to convey open pressurized hydraulic fluid 22 to slave valve 12 when applied by open hydraulic fluid source 18 selectively, as indicated by the dashed arrow in FIG. 3, according to position of a sensor piston 106 (shown in FIG. 5) disposed within hydraulic line balance manifold 100, as will be described.

Close hydraulic fluid source 20 is configured to selectively apply close pressurized hydraulic fluid 28 to slave valve 12 for closing slave valve 12. In this respect close hydraulic fluid source 20 is disposed on surface 4 and is connected to hydraulic line balance manifold 100 by an upper close line 30. Hydraulic line balance manifold 100 in turn connects upper close line 30 to slave valve 12 through a lower close line 32. Lower close line 32 and upper close line 30 are both configured to convey close pressurized hydraulic fluid 28 to slave valve 12 when applied by close hydraulic fluid source 20 selectively, as indicated by the dashed arrow showing close pressurized hydraulic fluid 28 in FIG. 3, also according to position of sensor piston 106 disposed within hydraulic line balance manifold 100. Although shown in FIG. 3 and described herein as separate fluid sources, it is to be understood and appreciated that open hydraulic fluid source 18 and close hydraulic fluid source 20 can be a common pressurized fluid source, the single pressurized fluid connected to upper open line 24 and upper close line 30 through a switching device arranged to bias pressure in one relative to the other.

As will be appreciated by those of skill of the art in view of the present disclosure, hydraulically controlled and operated devices such as slave valve 12 can sometimes require mechanical operation instead of hydraulically by using a mechanical shifting tool, e.g., intervention tool 9 (shown in FIG. 1), run down to the slave valve by wireline or coiled tubing. The majority of resistance to movement encountered by the operator of the intervention equipment will be the hydraulic fluid itself, as the hydraulic fluid typically will need to be pushed up the control line to the surface to operate the device with the intervention equipment.

As shown in FIG. 4, it is also contemplated that slave valve 12 can be controlled through remote open close technology ROCT hydraulic control system 103, wherein hydraulic control over slave valve 12 is exercised over relatively short hydraulic lines from a downhole fluid source/return 19 located within wellbore 2. Like non-ROCT applications, where the frictional resistance over the relatively long control line and the hydrostatic weight of the fluid must be overcome by mechanical force exerted by the shifting tool and the toolstring, ROCT hydraulic devices can also require mechanical intervention to manually operate the device. The force applied during the intervention can also be considerable due to flow restrictions within the downhole ROCT hydraulic control lines.

To reduce the force requirements, both non-ROCT hydraulic control system 102 (shown in FIG. 3) and ROCT hydraulic control system 103 (shown in FIG. 4) include hydraulic line balance manifold 100. Hydraulic line balance manifold 100 is arranged between the fluid source/return and the hydraulic device such that the upper lines can be selectively disconnected from the lower lines to limit the force necessary to operate the hydraulic device during an override or intervention event. In non-ROCT applications, such as exemplary hydraulic control system 102 (shown in FIG. 3), hydraulic line balance manifold 100 is arranged between fluid source 18 and fluid return 20, and slave valve 12 to enable disconnection of upper open line 24 from lower open line 26 and disconnection of upper close line 30 from lower close line 28 at a downhole location. Disconnection at a downhole location, in proximity to slave valve 12 for example, reduces the amount of the frictional resistance between the hydraulic fluid and the control lines that need be overcome by the shifting tool during an override or intervention event.

In ROCT applications, such as exemplary hydraulic control systems 103 (shown in FIG. 4), hydraulic line balance manifold 100 is arranged between fluid source/return 19 and slave valve 12 to enable disconnection of upper open line 24 from lower open line 26, and upper close line 30 from lower close line 32. This also reduces the amount resistance encountered by the shifting tool during an override or intervention event as force applied to gate valve need not be sufficient to force fluid through structures within ROCT fluid source/return 19 like the switch valve, pump, and pressure regulator valves located within ROCT fluid source/return 19.

Figure 5:
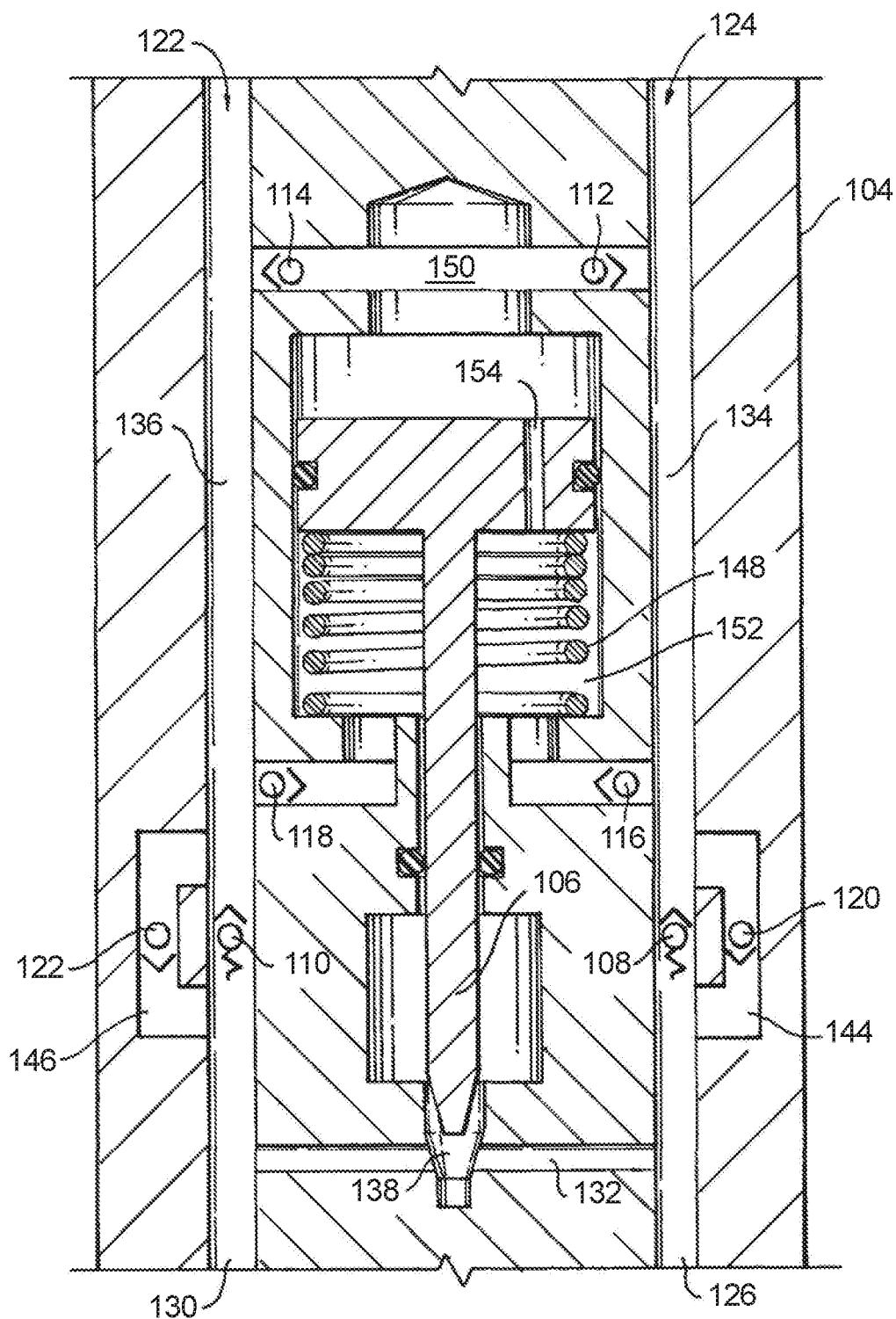
FIG. 5 is a cross-sectional view of the hydraulic line balance manifold of FIG. 1, schematically showing first and second open ports of the hydraulic line balance manifold coupled by an open channel, first and second close ports of the hydraulic line balance manifold coupled by a close channel, and a bypass channel within the hydraulic line balance selectively connecting the open channel to the close channel according to position of a sensor piston disposed within the hydraulic line balance manifold.

With reference to FIG. 5, hydraulic line balance manifold 100 is shown. Hydraulic line balance manifold 100 is configured for placement within wellbore 2 along string 8 and includes a housing 104, a sensor piston 106, an open pressure relief valve (PRV) 108, and a close PRV 110. Hydraulic line balance manifold 100 also includes a first pressure check valve 112, a second pressure check valve 114, a first return check valve 116, and a second return check valve 118. Hydraulic line balance manifold 100 additionally includes an open PRV bypass check valve 120 and a close PRV bypass check valve 122.

Housing 104 has a first open port 124, a second open port 126, a first close port 128, and a second close port 130. First open port 124 and second open port 126 are configured for fluidly coupling an upper open line, e.g., upper open line 24 (shown in FIG. 3), to a downhole tool, e.g., slave valve 12 (shown in FIG. 1). More particularly, first open port 124 is connected to upper open line 24 and is in fluid communication therethrough with open hydraulic fluid source 18. Second open port 126 is connected to lower open line 26 and is in fluid communication therethrough with slave valve 12. Fluid communication between upper open line 24 and lower open line 26 is selective, hydraulic line balance manifold 100 fluidly coupling upper open line 24 to lower open line 26 when open pressurized hydraulic fluid 22 or close pressurized hydraulic fluid 28 exceeds a predetermined pressure. In certain embodiments the predetermined pressure is about 500 psi, which enables hydraulic line balance manifold 100 to be readily incorporated into existing hydraulic control systems.

First close port 128 and second close port 130 are configured for fluidly coupling an upper open line, e.g., upper close line 30 (shown in FIG. 3), to a downhole tool, e.g., slave valve 12 (shown in FIG. 1). More particularly, first close port 128 is connected to upper close line 30 and is in fluid communication therethrough with close hydraulic fluid source 20. Second close port 130 is connected to lower close line 32 and is in fluid communication therethrough with slave valve 12. Fluid communication between upper close line 30 and lower close line 32 is also selective, hydraulic line balance manifold 100 fluidly coupling upper close line 30 to lower close line 32 when either (or both) close pressurized hydraulic fluid 28 or open pressurized hydraulic fluid 22 exceeds the predetermined pressure.

Housing 104 also has (or defines within its interior) an open channel 134 and a close channel 136. Open channel 134 fluidly couples first open port 124 with second open port 126. Open PRV 108 is arranged within open channel 134 and is configured to oppose fluid flow from first open port 124 to second open port 126. An open PRV bypass channel 144 is coupled to open channel 134 and is in fluid communication with opposite ends of open PRV 108. Open PRV bypass check valve 120 is arranged along open PRV bypass channel 144 and is arranged to allow one way fluid flow from second open port 126 to first open port 124.

Close channel 136 fluidly couples first close port 128 with second close port 130. Close channel 136 fluidly couples first close port 128 with second close port 130. Close PRV 110 is arranged within close channel 136 and is configured to oppose fluid flow from first close port 128 to second close port 130. A close PRV bypass channel 146 is fluidly coupled to close channel 136 and is in fluid communication with close channel at opposite ends of close PRV 110. Close PRC bypass check valve 122 is arranged along close PRV bypass channel 146 and is arranged to allow one way fluid flow from second close port 130 to first close port 128.

A bypass channel 132 is defined with housing 104 for fluidly selectively coupling second open port 126 with second close port 130 according to fluid pressure within both the upper open line and the upper open line, e.g., upper open line 24 (shown in FIG. 3) and upper close line 30 (shown in FIG. 3). In this respect bypass channel 132 fluidly connects to open channel 134 to close channel 136. Along its length bypass channel 132 defines a sensor piston seat 138. Sensor piston seat 138 is configured to receive sensor piston 106 to limit fluid communication between open channel 134 and close channel 136.

Sensor piston 106 is slidably disposed within the housing 104 and has a first position 140 (shown in FIG. 5) relative to housing 142 and a second position 142 (shown in FIG. 7) relative to housing 104. In first position 140 sensor piston 106 abuts sensor piston seat 138, preventing prevents fluid from traversing bypass channel 132 and fluidly uncoupling second open port 126 from second close port 130 through bypass channel 132. In second position 142 sensor piston 106 is spaced apart from sensor piston seat 138, bypass channel 132 thereby allowing fluid to traverse bypass channel 132 and bypass channel 132 fluidly coupling second open port 126 to second close port 130. Movement between first position 140 and second position 142 is according to the balance of forces applied to sensor piston 106 by fluid pressure at first open port 124 and first close port 128, and a resilient member 148, e.g., a spring, arranged within housing 104. In this respect housing 104 has (or defines) within its interior a pressure chamber 150 and a return chamber 152.

Figure 6:
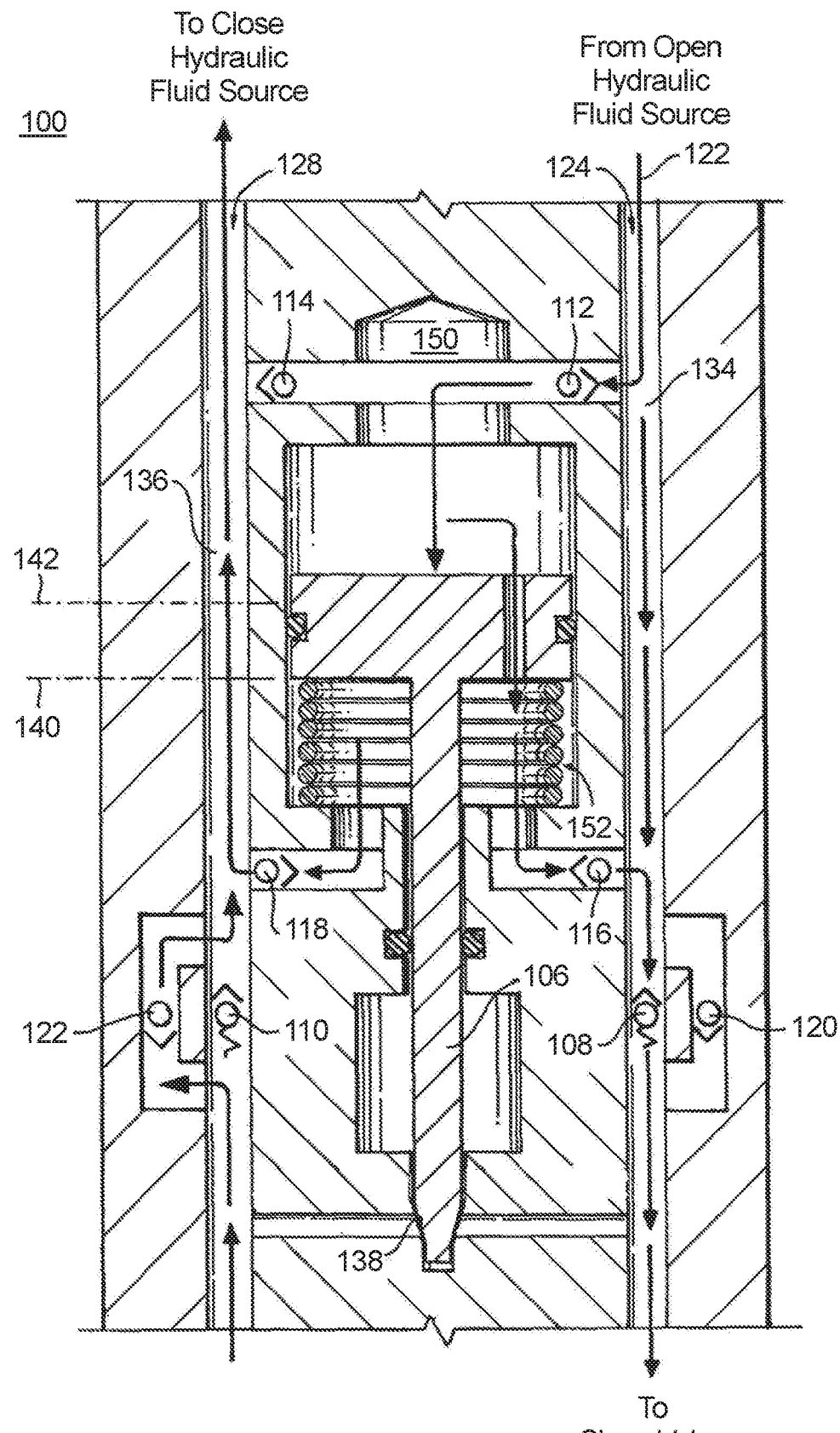
FIG. 6 is a cross-sectional view of the hydraulic line balance manifold of FIG. 1, schematically showing the sensor piston retained in the first position by fluid pressure provided above a predetermined pressure at the first open port and applied to the slave valve through the open channel and the second open port, and therethrough to the slave valve.

With reference to FIG. 6, hydraulic line balance manifold 100 is shown with sensor piston 106 in first position 140. Pressure chamber 150 is arranged on a side of sensor piston 106 opposite sensor piston seat 138. Pressure chamber 150 is in fluid communication with open channel 134 through first pressure check valve 112, which is arranged to allow fluid flow from open channel 134 to pressure chamber 150 and oppose fluid flow from pressure chamber 150 to open channel 134. Pressure chamber 150 is also in fluid communication with close channel 136 through second pressure check valve 114, which is arranged to allow fluid flow from close channel 136 to pressure chamber 150 and oppose fluid flow from pressure chamber 150 to close channel 136.

Return chamber 152 is arranged on a side of sensor piston 106 opposite pressure chamber 150 and is between pressure chamber 150 and sensor piston seat 138. Return chamber 152 is in fluid communication with open channel 134 through second return check valve 116, which is arranged to allow fluid flow from return chamber 152 to open channel 134 and oppose fluid flow from close channel 136 to return chamber 152. Return chamber 152 is also in fluid communication with close channel 136 through second return check valve 118, which is arranged to allow fluid flow from return chamber 152 to close channel 136 and oppose fluid flow from open channel 134 to return chamber 152. A restrictor channel 154 fluidly couples pressure chamber 150 with return chamber 152, restrictor channel 154 defining a relatively small flow area for allowing limited flow therethrough to allow limited flow from pressure chamber 150 to return chamber as resilient member 148 urges sensor piston 106 between first position 140 and second position 142.

Figure 7:
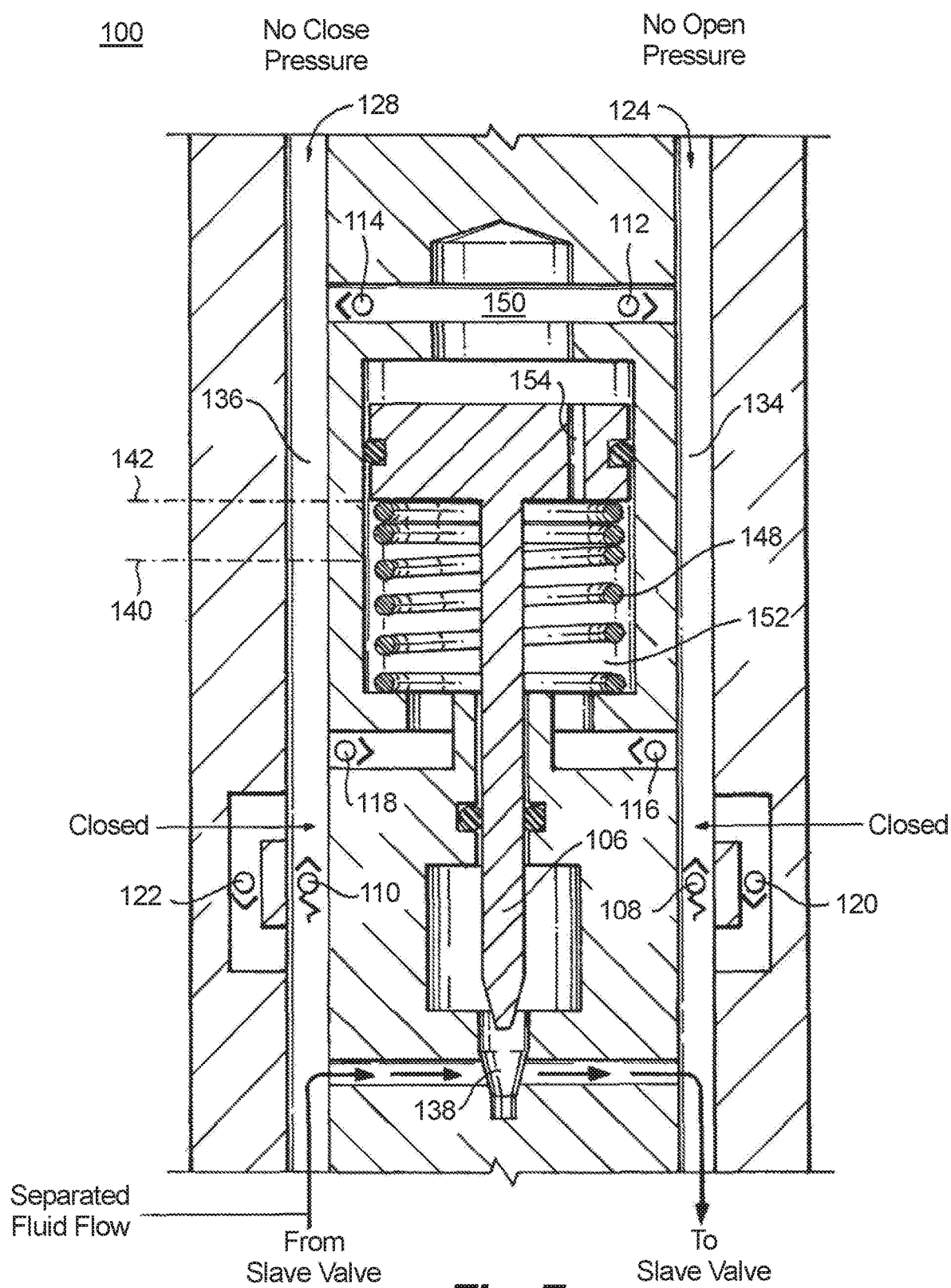
FIG. 7 is a cross-sectional view of the hydraulic line balance manifold of FIG. 1, schematically showing the sensor piston in the second position when fluid pressure applied at the first open port and first close port is insufficient to overcome a biasing force exerted on the sensor piston, the surface lines thereby being fluidly uncoupled from the downhole lines and the downhole lines in fluid communication with one another through a bypass channel within the hydraulic line balance manifold.

With reference to FIG. 7, it is contemplated that, in certain embodiments, hydraulic line balance manifold 100 have a default arrangement wherein, absent application of open pressurized hydraulic fluid 22 to first open port 124 and/or close pressurized hydraulic fluid 28 (shown in FIG. 3) to first close port 128, hydraulic line balance manifold fluidly separate upper open line 24 and upper close line 30 from slave valve 12 (shown in FIG. 3). Absence of open pressurized hydraulic fluid 22 to first open port 124 and/or close pressurized hydraulic fluid 28 (shown in FIG. 3) at first close port 128 allows force exerted by resilient member 148 member to urge sensor piston 106 to move between first position 140 to second position 142. As will be appreciated by those of skill in the art in view of the present disclosure, first pressure check valve 112 and second pressure check valve 114 oppose fluid flow from pressure chamber 150 to open channel 134 and close channel 136. Fluid therefore flows from pressure chamber 150 through restrictor channel 154 and to open channel 134 and/or close channel 134 through first return check valve 116 and/or second return check valve 118, allowing sensor piston 106 to respond to a biasing force exerted on sensor piston 106 to displace toward second position 142.

Displacement of sensor piston 106 toward second position 142 spaces sensor piston 106 from sensor piston seat 138. Once spaced apart from sensor piston seat 138, sensor piston 106 allows fluid communication between open channel 134 and close channel 136 through bypass channel 132. The fluid communication between open channel 134 and close channel 136 through bypass channel 132 places bypass channel 132 and slave valve 12 in fluid communication with one another through second open port 126 and second close port 130. As will be appreciated by those of skill in the art in view of the present disclosure, fluid communication between second close port 130 and second open port 126 via bypass channel 132 allows fluid from slave valve 12 to balance between itself within slave valve 12 through bypass channel 132 during an override intervention event, reducing the amount of mechanical force necessary to be applied to slave valve 12 during the intervention. As will also be appreciated by those of skill in the art in view of the present disclosure, fluid can move via the path of least resistance through bypass channel 132, limiting the amount of force necessary to mechanically operate slave valve 12 via an intervention device. In certain embodiments, fluid redistribution occurs with relatively little (or none whatsoever) interaction with fluid present in upper open line 24 and upper close line 30 due to operation of open PRV 108 and close PRV 110, which cooperate with open PRV bypass check valve 120 and close PRV bypass check valve 122 to fluidly isolate bypass channel 132 from first open port 124 and first close port 128, respectively. This reduces the need to shift fluid through the entirety of upper open line 24 and/or the entirety of upper close line 30 during movement of the valve member in slave valve 12, reducing intervention force required to intervention.

Referring again to FIG. 6, upon application of open pressurized hydraulic fluid 22 at first open port 124 fluid deadheads (initially) against open PRV 108 and open PRV bypass check valve 120, and flows into pressure chamber 150. The fluid flowing into pressure chamber 150 from first open port 124 exerts force against sensor piston 106, urging sensor piston 106 in the direction of first position 140 from second position 142 relative to housing 104. The force displaces sensor piston 106 to first position 140 from second position 142, wherein sensor piston 106 abuts sensor piston seat 138. Abutment of sensor piston 106 against sensor piston seat 138 ceases fluid communication between open channel 134 and close channel 136, pressure thereafter building within open channel 134 until such the pressure reaches the opening pressure of open PRV 108, at which point open PRV 108 opens. Opening of open PRV 108 places first open port 124 in fluid communication with second open port 126, lower open line 26 (shown in FIG. 3) thereby being in fluid communication with slave valve 12 through hydraulic line balance manifold 100 and upper open line 24, slave valve 12 thereafter being controlled by fluid pressure applied to first open port 124 and first close port 128 for surface control of slave valve 12 via varying pressure balance between upper open line 24 and upper close line 30.

Figure 8:
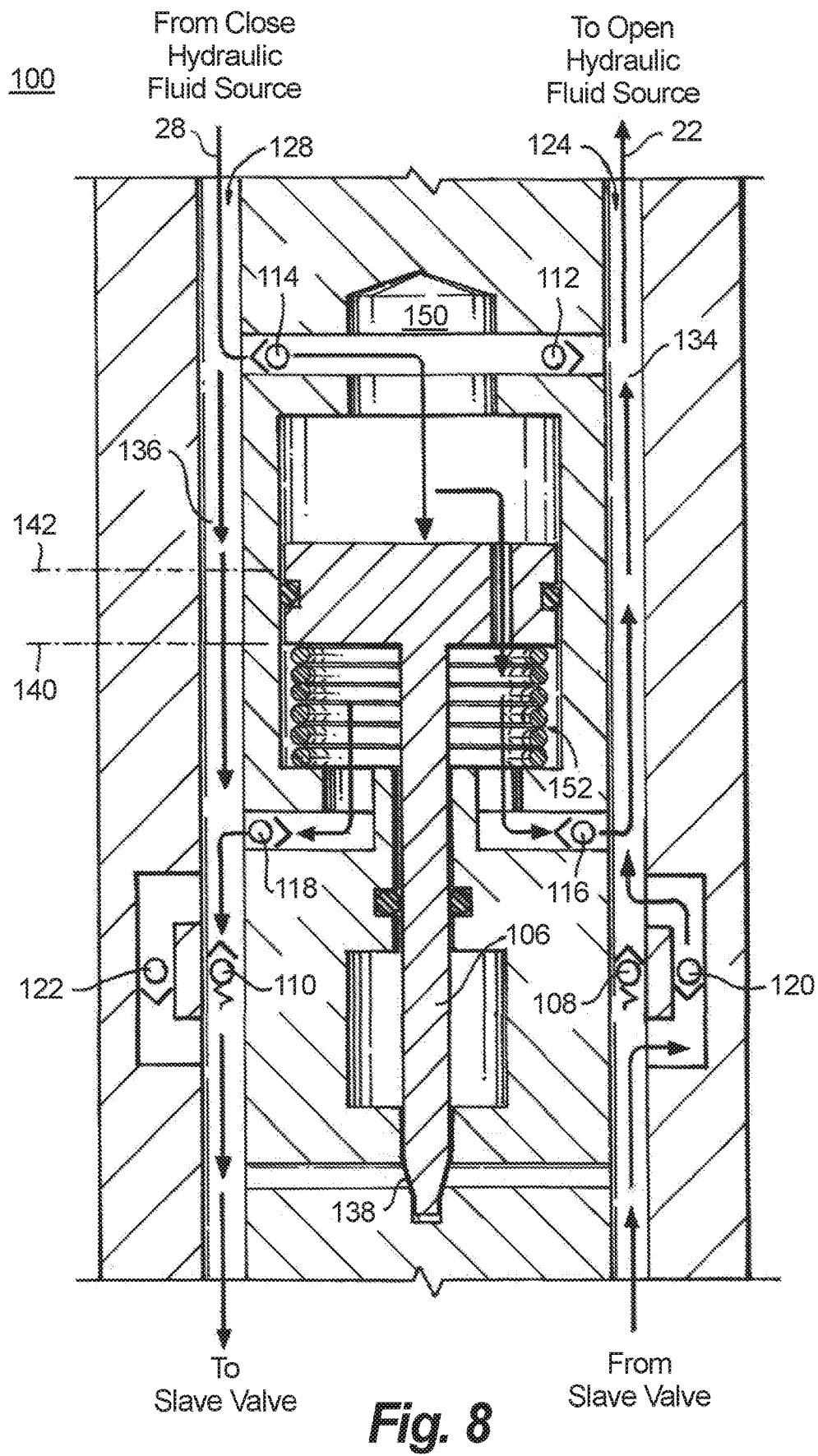
FIG. 8 is a cross-sectional view of the hydraulic line balance manifold of FIG. 1, schematically showing the sensor piston retained in the first position by fluid pressure provided above a predetermined pressure at the first close port and applied to the slave valve through the close channel and the second close port, and therethrough to the slave valve.

With reference to FIG. 8, fluid flow through hydraulic line balance manifold 100 is shown upon application of close pressurized hydraulic fluid 28. Close pressurized hydraulic fluid 28 enters pressure chamber 150 and exerts a closure force on sensor piston 106. The closure force drives sensor piston 106 from second position 142 to first position 140, causing sensor piston 106 to abut sensor piston seat 138. Abutment of sensor piston 106 against sensor piston seat 138 fluidly uncouples close channel 136 from open channel 134 through bypass channel 132. Fluid pressure thereafter builds within close channel 136 until the predetermined pressure is exceeded between close PRV 110 and first close port 128, at which point close PRV 110 opens, second close port 130 thereby being in fluid communication with first close port 128 through close channel 136.

In certain embodiments, sensor piston 106 overcomes biasing force exerted on sensor piston 106 by resilient member 148 when pressure applied at first open port 124 and or first close port 128 exceeds the predetermined cracking pressure of open PRV 108 and/or close PRV 110. In certain embodiments the predetermined cracking pressure is about 500 psi cracking pressure, which is sufficient to displace sensor piston 106 against sensor piston seat 138 and into abutment therewith, whereat sensor piston 106 ceases fluid communication through bypass channel 132 and open channel 134 is fluidly decoupled from close channel 136, are separated and independent of each other. Continued pressure will operate slave valve 12 (shown in FIG. 1) as normal, allowing pressure to act against valve member 7 (shown in FIG. 1) of slave valve 12, fluid applied to slave valve 12 via one of the lower open line 26 and lower close line 32 slave valve returning to surface 4 (shown in FIG. 1) via the other of lower open line 26 and lower close line 32.

When the pressure is removed from both first open port 124 and first close port 128, e.g., by being bled from either (or both) close hydraulic fluid source 20 (shown in FIG. 3) or open hydraulic fluid source 18 (shown in FIG. 3), sensor piston 106 moves to second position 142 (shown in FIG. 6) in response to biasing force exerted on it by resilient member 148 (shown in FIG. 5), upper open line 24 (shown in FIG. 3) and upper close line 30 (shown in FIG. 3) each becoming disconnected from lower open line 26 (shown in FIG. 3) and lower close line 32 (shown in FIG. 3), respectively. When sensor piston 106 is in second position 142 mechanical override operations require relatively little force that would otherwise be necessary to move valve member 7 (shown in FIG. 1) due to fluid now being circulated only around a short hydraulic loop between lower open line 26, slave valve 12, lower close line 32, and bypass channel 132 within hydraulic line balance manifold 100.

Figure 9:
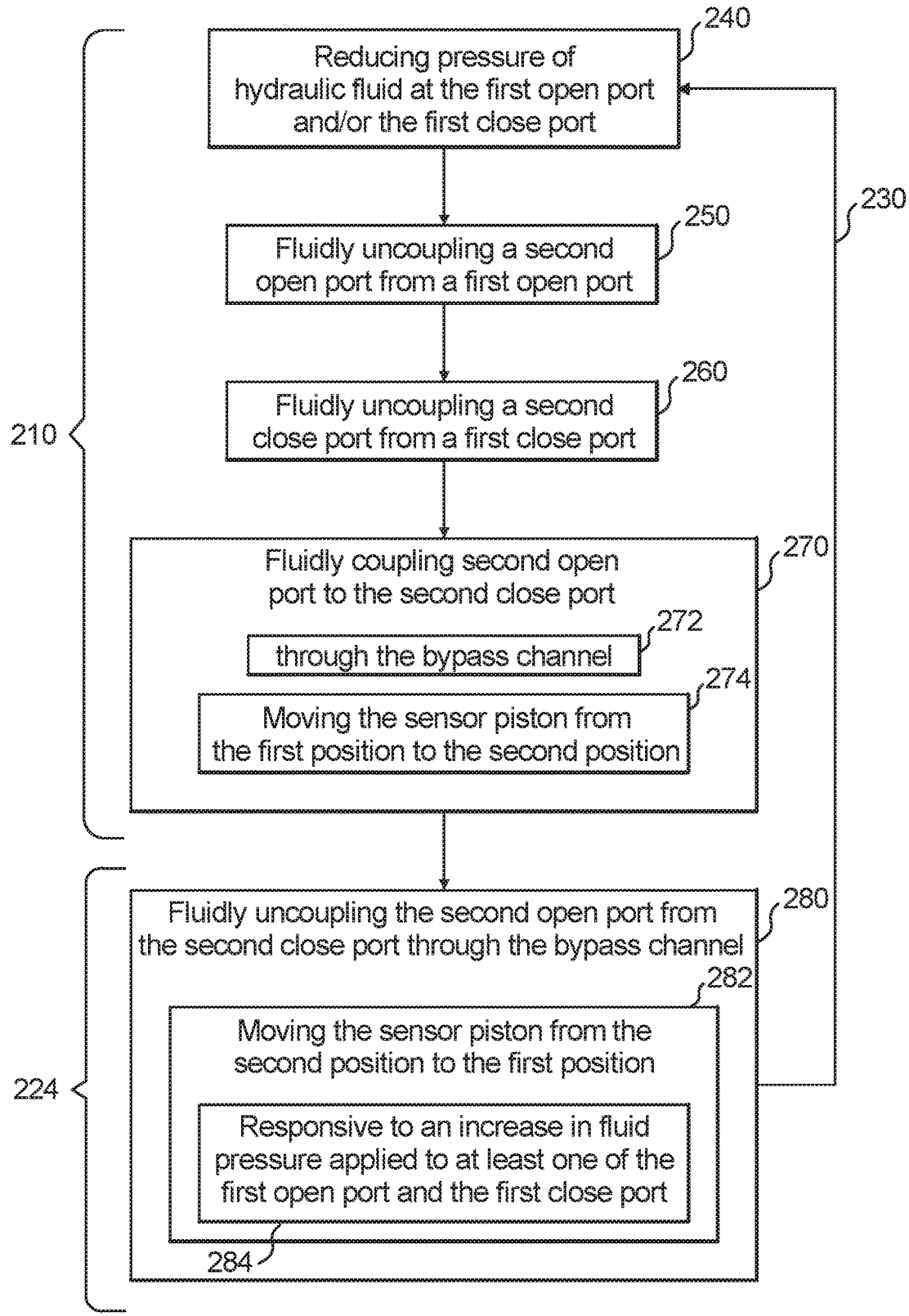
FIG. 9 is a block diagram of a method of controlling hydraulic flow to a slave valve using the hydraulic line balance manifold of FIG. 1, showing steps of the method.

With reference to FIG. 9, a method 200 of controlling hydraulic fluid flow to a slave valve, e.g., slave valve 12

(shown in FIG. 1), is shown. Method 200 generally includes fluidly uncoupling surface hydraulic fluid lines, e.g., upper open line 24 (shown in FIG. 3) and upper close line 30 (shown in FIG. 3), from downhole hydraulic fluid lines, e.g., lower open line 26 (shown in FIG. 3) and lower close line 32 (shown in FIG. 3), as shown with bracket 210, and fluidly re-coupling the downhole hydraulic fluid lines with the surface hydraulic lines, as shown with bracket 220. The uncoupling and recoupling can occur iteratively, as shown with arrow 230, such as during an override intervention event.

Uncoupling 210 the surface hydraulic lines from the downhole hydraulic lines includes reducing pressure of hydraulic fluid applied to at least one of a first open port and a first close port, e.g., first open port 124 (shown in FIG. 5) and second open port 126 (shown in FIG. 5), a shown with box 240. Responsive to reduction of hydraulic fluid pressure at the first open port a second open port, e.g., second open port 126 (shown in FIG. 5), is fluidly uncoupled from the first open port, as shown with box 250. Responsive to reduction of hydraulic fluid pressure the first close port a second close port, e.g., second close port 130 (shown in FIG. 5), is fluidly uncoupled from the first close port, as shown with box 260.

Fluid communication is then established fluidly coupling the second close port with the second open port, as shown with box 270. It is contemplated that fluidly coupling the second close port with the second open port be through a bypass channel, e.g., bypass channel 132 (shown in FIG. 5), as shown with box 272. It is also contemplated that fluidly coupling the second close port with the second open port be accomplished by moving a sensor piston, e.g., sensor piston 106 (shown in FIG. 5), from a first position to the a second position, e.g., first position 140 (shown in FIG. 5) and second position 142 (shown in FIG. 5), as shown with box 274.

Coupling 220 the downhole hydraulic lines to the surface hydraulic lines includes fluidly uncoupling the second close port from the second open port through the bypass channel, as shown with box 280. Coupling 220 the downhole hydraulic lines to the surface hydraulic lines can include moving the sensor piston from the second position to the first position, as shown with box 282. Coupling 220 the downhole hydraulic lines to the surface hydraulic lines can be in response to an increase in fluid pressure applied to at least one of the first open port and the first close port, as shown with box 284.

Accordingly, as set forth above, the embodiments disclosed herein may be implemented in a number of ways. For example, in general, in one aspect the disclosed embodiments relate to a hydraulic line balance manifold for a hydraulic control system. The hydraulic line balance manifold comprises, among other things, a housing having first and second open ports for fluidly coupling an upper open line to a downhole tool. The housing also has first and second close ports for fluidly coupling an upper close line to the downhole tool. The housing additionally has a bypass channel for fluidly coupling the second open port with the second close port according to pressure within both the upper open line and the upper close line. A sensor piston is slidably disposed within the housing, the sensor piston having a first position relative to the housing wherein the second open port is fluidly uncoupled from the second close port through the bypass channel, the piston having a second position relative to the housing wherein the second open port is fluidly coupled to the second close port through the bypass channel for reducing fluid resistance to mechanical operation of the downhole tool in a mechanical override intervention operation.

In accordance with any of the foregoing embodiments, the housing can define an open channel fluidly coupling the first and second open ports, the open channel being in communication with the sensor piston for moving the sensor piston between the first and second positions.

In accordance with any of the foregoing embodiments, the open channel can include a pressure chamber and a return chamber defined within the housing and in fluid communication with one another through a restrictor channel extending through the sensor piston.

In accordance with any of the foregoing embodiments, first and second check valves can be arranged along the open channel, the first check valve arranged to oppose fluid flow from the pressure chamber to the first open port, the second check valve arranged to oppose fluid flow from the first and second open ports to the return chamber.

In accordance with any of the foregoing embodiments, the housing can define a close channel fluidly coupled to the first and second close ports, the close channel in communication with the sensor piston for moving the sensor piston between the first and second positions.

In accordance with any of the foregoing embodiments, the close channel can include a pressure chamber and a return chamber defined within the housing and in fluid communication with one another through a restrictor channel extending through the sensor piston.

In accordance with any of the foregoing embodiments, first and second check valves can be arranged along the close channel, the first check valve arranged to oppose fluid flow from the pressure chamber to the first close port, the second check valve arranged to oppose fluid flow from the first and second close ports to the return chamber.

In accordance with any of the foregoing embodiments, a resilient member can be arranged between the housing and the sensor piston, the resilient member arranged to bias the sensor piston toward the second position.

In accordance with any of the foregoing embodiments, the line balance manifold can include an open PRV and a close PRV, the open PRV arranged between the first and second open ports, the close PRV arranged between the first and second close ports.

In accordance with any of the foregoing embodiments, the open PRV can be arranged to oppose fluid flow from the first open port to the second open port, the housing having an open PRV bypass channel fluidly coupling the first open port with the second open port, a check valve arranged in the open PRV bypass channel and arranged to oppose fluid flow from the first open port to the second open port.

In accordance with any of the foregoing embodiments, the close PRV can be arranged to oppose fluid flow from the first close port to the second close port, the housing having a close PRV bypass channel fluidly coupling the first close port with the second close port, a check valve arranged in the close PRV bypass channel and arranged to oppose fluid flow from the first close port to the second close port.

In accordance with any of the foregoing embodiments, the bypass channel can define a sensor piston seat, the sensor piston abutting the sensor piston seat in the first position, the sensor piston being spaced apart from the sensor piston seat in the second position.

In general, in another aspect, the disclosed embodiments relate to a downhole hydraulic control system including the hydraulic line balance module. The hydraulic line balance manifold is arranged within a wellbore. The downhole hydraulic control system includes, among other things, an open hydraulic fluid source in fluid communication with the first open port and a close hydraulic fluid source in fluid communication with the second open port. At least one of the open and close hydraulic fluid sources are arranged outside of the wellbore.

In accordance with any of the foregoing embodiments, the downhole hydraulic control system can include a hydraulically controlled slave valve, the slave valve in fluid communication with the second open port by an open line, the slave valve in fluid communication with the second close port by a close line.

In accordance with any of the foregoing embodiments, the housing can define an open channel fluidly coupled to the first and second open ports, the open channel in communication with the sensor piston for moving the piston between the first and second positions; and a close channel fluidly coupled to the first and second close ports, the close channel in communication with the sensor piston for moving the piston between the first and second positions.

In accordance with any of the foregoing embodiments, the open channel can include a pressure chamber and a return chamber defined within the housing and in fluid communication with one another through a restrictor channel extending through the sensor piston, the close channel extending through the pressure chamber and the return chamber via the restrictor channel extending through the sensor piston.

In accordance with any of the foregoing embodiments, the bypass channel can define a sensor piston seat, the sensor piston abutting the sensor piston seat in the first position, the sensor piston spaced apart from the sensor piston seat in the second position, and a resilient member being arranged between the housing and the sensor piston, the resilient member arranged to bias the sensor piston toward the second position.

In general, in a further aspect, the disclosed embodiments relate to methods of controlling hydraulic fluid flow to a slave valve. More particularly, at a hydraulic line balance manifold with a housing having first and second open ports, first and second close ports, a bypass channel, and a sensor piston slidably disposed within the housing with first and second positions relative to the housing, the second open port is fluidly coupled to the second close port, and the second open port is fluidly uncoupled from the second close port through the bypass channel by moving the sensor piston from the first position to the second position.

In accordance with any of the foregoing embodiments moving sensor piston from the first position to the second position can include reducing pressure of hydraulic fluid at the first open port and/or the first close port.

In accordance with any of the foregoing embodiments fluidly uncoupling the second open port from the second close port through the bypass channel can be accomplished by moving the sensor piston from the second position to the first position, movement of the sensor piston being in response to an increase in fluid pressure applied at one of the first open port and the first close port.

The methods and systems of the present disclosure, as described above and shown in the drawings, provide for hydraulic control system with superior properties including the capability to separate a hydraulically controlled slave valve from the hydraulic fluid pressure source, thereby reducing the amount of mechanical force necessary to operate the slave valve during an intervention event, extended useable life, and improved reliability relative to traditional systems and methods. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A hydraulic line balance manifold for a hydraulic control arrangement, comprising:
   a housing having first and second open ports for fluidly coupling an upper open line to a downhole tool, first and second close ports for fluidly coupling an upper close line to the downhole tool, and a two-way bypass channel for fluidly coupling the second open port with the second close port according to pressure within both the upper open line and the upper close line; and
   a sensor piston slidably disposed within the housing, the piston having a first position relative to the housing wherein the second open port is fluidly uncoupled from the second close port through the two-way bypass channel, the piston having a second position relative to the housing wherein the second open port is fluidly coupled to the second close port through the two-way bypass channel for reducing fluid resistance to mechanical operation of a slave valve in a mechanical override intervention operation.

2. The hydraulic line balance manifold as recited in claim 1, wherein the housing defines an open channel fluidly coupled to the first and second open ports, the open channel in communication with the sensor piston for moving the piston between the first and second positions.

3. The hydraulic line balance manifold as recited in claim 2, wherein the open channel includes a pressure chamber and a return chamber defined within the housing and in fluid communication with one another through a restrictor channel extending through the sensor piston.

4. The hydraulic line balance manifold as recited in claim 3, further comprising first and second check valves arranged along the open channel, the first check valve arranged to oppose fluid flow from the pressure chamber to the first open port, the second check valve arranged to oppose fluid flow from the first and second open ports to the return chamber.

5. The hydraulic line balance manifold as recited in claim 1, wherein the housing defines a close channel fluidly coupled to the first and second close ports, the close channel in communication with the sensor piston for moving the piston between the first and second positions.

6. The hydraulic line balance manifold as recited in claim 5, wherein the close channel includes a pressure chamber and a return chamber defined within the housing and in fluid communication with one another through a restrictor channel extending through the sensor piston.

7. The hydraulic line balance manifold as recited in claim 6, further comprising first and second check valves arranged along the close channel, the first check valve arranged to oppose fluid flow from the pressure chamber to the first close port, the second check valve arranged to oppose fluid flow from the first and second close ports to the return chamber.

8. The hydraulic line balance manifold as recited in claim 1, further comprising a resilient member arranged between the housing and the sensor piston, the resilient member arranged to bias the sensor piston toward the second position.

9. The hydraulic line balance manifold as recited in claim 1, further comprising an open pressure regulating valve (PRV) and a close PRV, the open PRV arranged between the first and second open ports, the close PRV arranged between the first and second close ports.

10. The hydraulic line balance manifold as recited in claim 9, wherein the open PRV is arranged to oppose fluid flow from the first open port to the second open port, the housing having an open PRV bypass channel fluidly coupling the first open port with the second open port, a check valve arranged in the open PRV bypass channel and arranged to oppose fluid flow from the first open port to the second open port.

11. The hydraulic line balance manifold as recited in claim 9, wherein the close PRV is arranged to oppose fluid flow from the first close port to the second close port, the housing having a close PRV bypass channel fluidly coupling the first close port with the second close port, a check valve arranged in the close PRV bypass channel and arranged to oppose fluid flow from the first close port to the second close port.

12. The hydraulic line balance manifold as recited in claim 1, wherein the bypass channel defines a sensor piston seat, the sensor piston abutting the sensor piston seat in the first position, the sensor piston spaced apart from the sensor piston seat in the second position.

13. A downhole hydraulic control arrangement, comprising:
a hydraulic line balance manifold as recited in claim 1, wherein the hydraulic line balance manifold is arranged within a wellbore;
an open hydraulic fluid source in fluid communication with the first open port; and
a close hydraulic fluid source in fluid communication with the first close port, wherein at least one of the open and close hydraulic fluid sources are arranged within the wellbore.

14. The downhole hydraulic control arrangement as recited in claim 13, further comprising a hydraulically controlled slave valve, the slave valve in fluid communication with the second open port by an open line, the slave valve in fluid communication with the second close port by a close line.

15. The downhole hydraulic control arrangement as recited in claim 13, wherein the housing defines an open channel fluidly coupled to the first and second open ports, the open channel in communication with the sensor piston for moving the piston between the first and second positions, and wherein the housing defines a close channel fluidly coupled to the first and second close ports, the close channel in communication with the sensor piston for moving the piston between the first and second positions.

16. The downhole hydraulic control arrangement as recited in claim 15, wherein the open channel includes a pressure chamber and a return chamber defined within the housing and in fluid communication with one another through a restrictor channel extending through the sensor piston, wherein the close channel extends through the pressure chamber and the return chamber via the restrictor channel extending through the sensor piston.

17. The downhole hydraulic control arrangement as recited in claim 13, wherein the bypass channel defines a sensor piston seat, the sensor piston abutting the sensor piston seat in the first position, the sensor piston spaced apart from the sensor piston seat in the second position, and further comprising a resilient member arranged between the housing and the sensor piston, the resilient member arranged to bias the sensor piston toward the second position.

18. A method of controlling hydraulic fluid flow to a slave valve, comprising:
at a hydraulic line balance manifold with a housing having first and second open ports for fluidly coupling an upper open line to a downhole tool, first and second close ports for fluidly coupling an upper close line to the downhole tool, a two-way bypass channel for fluidly coupling the second open port with the second close port according to pressure within both the upper open line and the upper close line, and a sensor piston slidably disposed within the housing with first and second positions relative to the housing;
fluidly coupling the second open port to the second close port through the two-way bypass channel by moving the sensor piston from the first position to the second position.

19. The method as recited in claim 18, wherein moving the sensor piston from the first position to the second position includes reducing pressure of hydraulic fluid at the first open port and/or the first close port.

20. The method as recited in claim 18, further comprising fluidly uncoupling the second open port from the second close port through the two-way bypass channel by moving the sensor piston from the second position to the first position, movement of the sensor piston being in response to an increase in fluid pressure applied at least one of the first open port and the first close port.

* * * * *